July 2, 1968  J. M. LYTTON  3,390,458
METHOD OF PREPARING FOR DENTAL IMPRESSIONS
Filed May 10, 1965
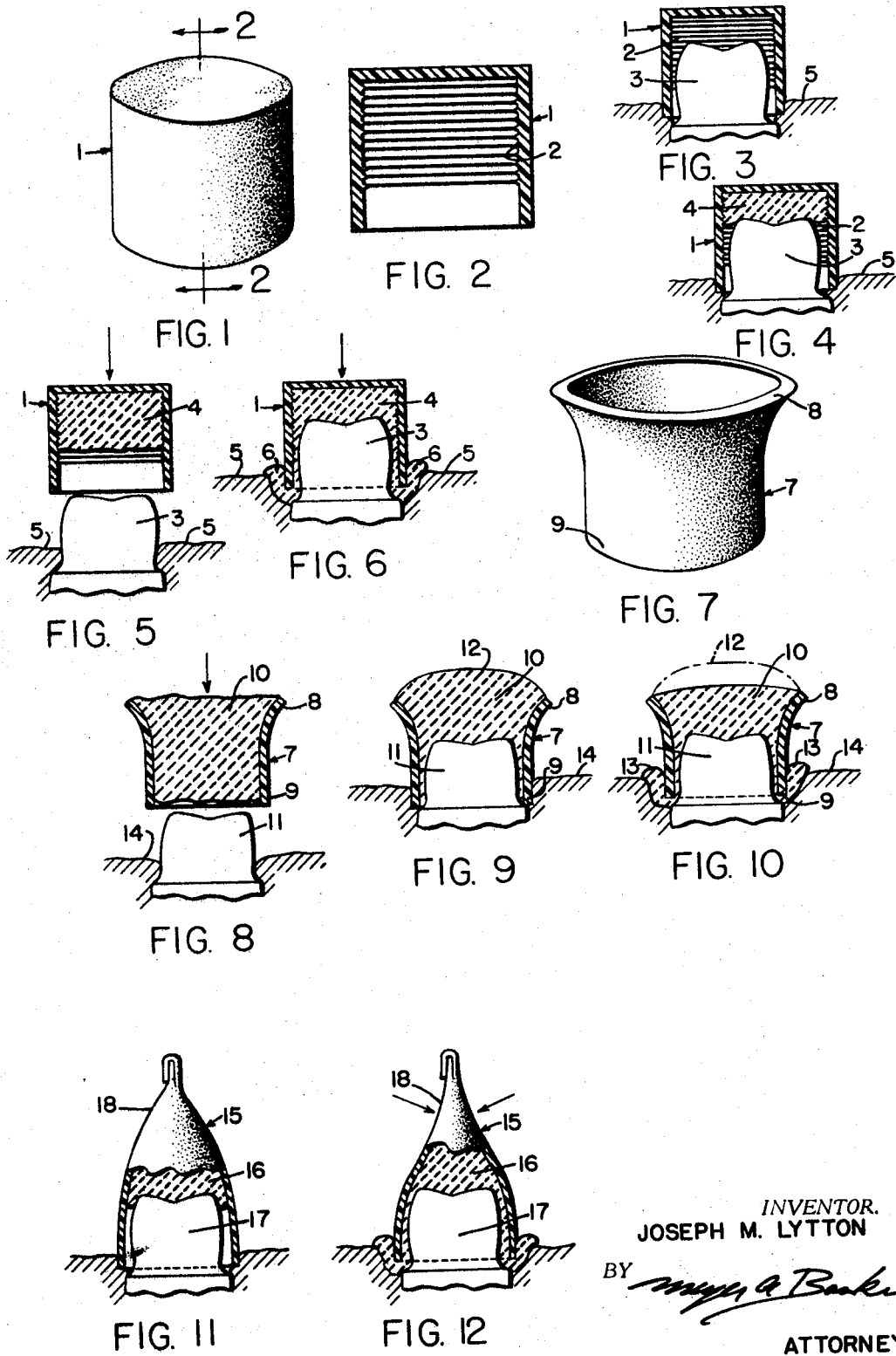
INVENTOR.
JOSEPH M. LYTTON
BY
ATTORNEY.

United States Patent Office 3,390,458
Patented July 2, 1968

3,390,458
METHOD OF PREPARING FOR DENTAL IMPRESSIONS
Joseph M. Lytton, 4747 Collins Ave.,
Miami Beach, Fla. 33139
Filed May 10, 1965, Ser. No. 454,483
2 Claims. (Cl. 32—17)

ABSTRACT OF THE DISCLOSURE

A method and apparatus in the dental art for assisting in obtaining an accurate impression of the root of the tooth below the gum line but not a method of taking dental impressions or making jackets and crowns. The method of this invention is accomplished by pressing down over the tooth, a thin walled tube made of deformable material so as to push or retract the tooth surface below the gum line. This process also involves partly filling said thin walled tube with a soft plastic like material when it is placed over the tube, pressing said gum over the tooth so as to retract the gum from the tooth surface and thereafter adding sufficiently soft plastic like material so that said material is squeezed out of the tube around the tooth below the gum line to further retract the tooth from the gum surface. This obviates the necessity of retracting the gum by the standard means of a cord or string being inserted around the base of the tooth.

In the standard procedure for placing a crown on a tooth, the tooth is cut down to a stump and the crown or jacket fitted over the stump and cemented, or otherwise fastened, directly to it. The principal problem in this procedure of fastening crowns or jackets to teeth has been in obtaining an exact and accurate impression of the tooth that has been cut down in preparation for a jacket or crown, particularly of the root portion that is normally one or two millimeters under the gum.

In the past it has been extremely difficult to take a good impression of the root of the tooth lying one or two millimeters under the gum because the gum interferes with taking of the impression, and bleeding.

To overcome this the standard procedure has been to force the gum away from the tooth by the use of small pieces of cord which are forced in between the gum and the tooth to separate the gum from the tooth in order to enable the impression to be taken. This method is quite unsatisfactory. It is difficult to get the cord into the proper position because it is uncomfortable and a strain on the patient since it takes about 10 to 15 minutes per tooth, and does not always do the right job.

It is an object of the present invention to overcome these difficulties by supplying a much simpler and easier method of retracting the gum so that the impression of the tooth underneath the gum can be readily and accurately obtained and a device for accomplishing the same.

By the use of the method of this invention a more precise, accurate and definite impression of the tooth underneath the gum can be made so that a better fitting crown, bridge, jacket, etc. can be fashioned for the portion of the tooth that is normally under the gum.

It should be noted that the present invention is not a method of making jackets or crowns, as such, but is simply a method and apparatus for more readily obtaining the impression of the portion of the tooth lying several millimeters under the gum.

It is an object of the present invention to provide a method for obtaining such an accurate impression much more readily and painlessly than has been done in the past.

In accordance with my present invention, a tube of deformable material in a size to fit over and go slightly under the gum line of the tooth which has been prepared for a crown is placed over the tooth of which the impression is desired.

In its preferred form, my invention contemplates having the tube partly filled with a soft plastic-type material that will flow under pressure when it is placed over the tooth. The tube is preferably closed at one end or may be open at both ends.

The tube is pressed down over the tooth until it contacts the gum and then pressed further down so as to retract or force the gum away from the tooth surface. The tube is then removed and an increment of additional soft plastic-type material is added into the tube and it is again placed over the tooth. This is repeated until sufficient of the soft plastic-type material is in the tube so that when it is pressed down, the soft plastic-type material flows or is squeezed out around the tooth and pushes the gum away from the tooth.

The dentist selects a tube from an assortment of different size tubes to fit the particular prepared tooth so that the tube can go one or two millimeters below the gum line. He then places a small amount of the semi-plastic material in the tube and fits the tube over the tooth. He then removes the tube and adds another small increment of the semi-plastic material and repeats this procedure until there is enough of the material in the tube to fill it when the tube is slightly under the gum. A small amount of semi-plastic material is added again. Pressure is applied by either the patient biting down on the tube or applying pressure manually so that the semi-plastic material is squeezed and flows out around the gum line, pushing the gum away from the tooth or retracting the gum. After remaining in place four to ten minutes, the tube and semi-plastic material are removed and the impression of the tooth taken in the conventional manner.

In its preferred form, the soft plastic contents of the tube are forced out around the bottom portion of the tube so as to further force the gum away from the tooth in a gentle manner. The soft plastic-type material which flows under the pressure applied will conform to the exact shape of the tooth and, therefore, uniformly retract the gum. After this is held in position for a short period of time, the entire tube including the soft plastic is removed. It has been found that the gum will remain in retracted position long enough for taking the impression of the tooth including the area that is normally under the gum. An exact, accurate impression is thereby made for the purpose of making a crown, bridge, jacket, etc.

The impression is then taken in conventional manner using a plastic which sets to a hard consistency, or semi-hard consistency. The soft plastic that is used to retract the gum may or may not set but may remain in a flexible form.

Additional objects of my invention will become evident as it is more fully described herein.

For a better understanding of the invention and its objects, reference is made to the accompanying drawing and the following description.

In the drawings:
FIGURE 1 is a perspective view of a typical flexible or deformable tube for use in my invention.
FIGURE 2 is a cross-sectional elevation view taken along the line of 2—2 of FIGURE 1.

FIGURE 3 is a cross-sectional elevation view of the flexible tube in position over a tooth that has been cut down for a crown with the tube one or two millimeters under the gum all around the tooth.

FIGURE 4 is a cross-sectional view similar to FIGURE 3, but showing the flexible tube partly filled with plastic material.

FIGURE 5 is an elevational view showing the flexible tube about to be placed over a tooth that has been cut down for a crown.

FIGURE 6 is a view similar to FIGURE 5 showing the flexible tube in position after it has been pressed down over the tooth and has retracted the gum.

FIGURE 7 is a perspective view of another shape of flexible tube that may be used in my invention.

FIGURE 8 is an elevational view showing the tube of FIGURE 7 in position to be placed over a tooth that has been cut down for a crown.

FIGURE 9 is the same view as that of FIGURE 8 after the flexible tube has been pushed down over the tooth and one or two millimeters under the gum all the way around the tooth.

FIGURE 10 is a similar view to that of FIGURE 9 after the plastic has been forced further down on the tooth so as to retract the gum.

FIGURE 11 shows another type of flexible tube in partial cross-section and partly filled with plastic material in position over a tooth.

FIGURE 12 shows the same tube as in FIGURE 11 presed down over the tooth.

In the drawing similar reference characters refer to similar parts throughout.

In my invention one form of the flexible tube 1 is closed at one end and preferably has serrations 2 on the inner surface of the tube 1. The flexible tube 1 may be pushed down over the tooth 3 and used to retract the gum as shown in FIGURE 3. However in the preferred form of my invention, as shown in FIGURES 4, 5, and 6, the tube 1 is partly filled with a soft semi-plastic material 4 such, for example, as wax, or putty, or clay, or the like, as shown in FIGURE 4. When downward pressure is applied on the tooth, as shown by the direction of the arrow in FIGURE 5 and FIGURE 6, the flexible tube 1 will first force the gum away from the tooth after which the plastic 4 is forced out of the tube 1 and immediately conforms to the shape of the tooth 3 in all directions, and further forces the gum 5 away from the tooth surface by oozing out around the bottom of the tube 1, as shown at 6 in FIGURE 6.

When the tube 1 and plastic 4 are held in the position shown in FIGURE 6 for approximately five to fifteen minutes the gum 5 is forced away from the surface of the tooth under the gum and after the tube 1 and the plastic 4 are removed the gum 5 will remain in its retracted position so that the impression can be made in the usual way.

FIGURE 7 shows another form of my invention in which a flexible tube 7 that is slightly wider at the top 8 than at the bottom 9 and is open at both ends is used. This tube 7 can also be filled with a semi-plastic material 10 and placed over a tooth 11, as shown in FIGURE 8. When forced down in the direction of the arrow, as shown in FIGURE 9, the tube first forces the gum away from the tooth while the plastic will bulge upwardly above the top of the tube 8, as shown in FIGURE 9. By applying pressure to the upward bulging portion 12, the plastic 10 is forced downwardly around the tooth 11, and is forced outwardly around the bottom of the tube 7 at 13, as shown in FIGURE 10. This retracts the gum 14 and when held in position for a few minutes and then removed, the gum retains its retracted position for long enough to make an exact impression in the conventional manner including the portion of the tooth several millimeters under the gum.

In another form of the present invention a flexible tubing may be used which has a tapered top, as shown in FIGURE 11. In this form of the invention the flexible tube 15 is filled with semi-plastic material 16 and forced over the tooth 17 and then, by squeezing the top 18 of the tube 15, the semi-plastic material 16 is forced out and retracts the gum, as shown in FIGURE 12. The advantage of this form of the invention is that it is sometimes more convenient to apply sideways or pinching type of pressure than to press straight down as is done in the forms of the invention shown in FIGURES 3-6 and 8-10.

It should be noted that the flexible tube device shown here in three different forms, FIGURES 1, 7 and 11, will be made in a variety of different sizes which are deformable to fit over different size and shapes of teeth. The object of the serrations 2 on the inner surface, as shown in FIGURE 2, is to make the soft plastic 4 adhere to the tube 1 so that when the tube 1 is removed the plastic 4 will all come away with the tube 1 and none of it will adhere to the tooth 3 so that a clean surface is presented for the impression work. Approximately 60 different sizes and shapes of the flexible tube may be needed. The serrations 2 may be omitted entirely if desired.

As pointed out above, the flexible tube itself will tend to deform so as to conform to the shape of the tooth and may be used alone for the purpose of retracting the gum. However, it has been found that the use of the soft plastic material, such as 4 and 10, is preferable.

In addition, the plastic tubing and the soft plastic by pressure not only retract the gum but also tend to suppress and stop bleeding of the gum. It should be noted that the soft plastic material retracts the gum but is not used to make an impression of the tooth. The impression is made by conventional means after the gum is retracted by the means of my invention.

As shown above, the important advantage of my invention is enabling the dentist to obtain an accurate impression of the portion of the tooth several millimeters below the gum line. This is the most important part of the tooth for making jackets or crowns and an accurate impression of the portion of the tooth is necessary to prevent leakage, discoloration or decay of the teeth after the work is completed.

Although several forms of my invention have been disclosed, the preferred form which is the simplest to use is that shown in FIGURE 1. Other variations will be apparent to those skilled in the art and my invention is to be limited only by the following claims.

I claim:

1. A process of preparing a tooth to obtain an accurate dental impression of the area of a tooth below the gum line consisting of placing over the tooth a tube made of deformable material of a size slightly larger than the said tooth, said tube being partly filled with a soft plastic-type material when it is placed over said tooth, said tube being pressed down over said tooth to such an extent so as to retract the tooth surface away from the gum line, and said soft plastic-type material will be squeezed out of said tube around said tooth near the gum line and will further retract the gum from said tooth surface thereafter removing said tube from said tooth and promptly applying a dental impression device to said tooth.

2. A process for preparing a tooth to obtain an accurate dental impression of the area of a tooth below the gum line consisting of placing over said tooth a tube made of deformable material of a size slightly larger than the said tooth, said tube being partly filled with a small amount of soft plastic-type material, said tube being pressed down over said tooth until said tube is forced between said tooth and the surrounding gum, said tube then being removed and an increment of said plastic-type material being added and the process repeated until said plastic-type material is squeezed out around said tooth at the gum line and pushes said gum further away from said tooth, thereafter removing said tube from said tooth and promptly applying a dental impression device to said tooth.

References Cited

UNITED STATES PATENTS

| | | | |
|---|---|---|---|
| 1,248,242 | 11/1917 | Babcock | 32—12 |
| 1,257,947 | 2/1918 | Sternberg | 32—17 |
| 1,764,244 | 6/1930 | Craigo | 32—18 |
| 1,812,008 | 6/1931 | Lace | 32—17 |
| 2,529,429 | 11/1950 | Spiro | 32—17 |
| 2,958,946 | 11/1960 | Chertkof | 32—17 |
| 3,058,216 | 10/1962 | Cohen | 32—17 |
| 3,151,393 | 10/1964 | Holmes | 32—17 |
| 3,304,608 | 2/1967 | Frohnecke | 32—17 |

RICHARD A. GAUDET, *Primary Examiner.*

K. L. HOWELL, J. W. HINEY, JR., *Assistant Examiners.*